(12) United States Patent
Thompson

(10) Patent No.: US 11,966,444 B2
(45) Date of Patent: Apr. 23, 2024

(54) DOCUMENT ANALYSIS METHOD AND APPARATUS

(71) Applicant: Trevor George Thompson, London (GB)

(72) Inventor: Trevor George Thompson, London (GB)

( * ) Notice: Subject to any disclaimer, the term of this patent is extended or adjusted under 35 U.S.C. 154(b) by 0 days.

(21) Appl. No.: 17/882,800

(22) Filed: Aug. 8, 2022

(65) Prior Publication Data

US 2023/0116085 A1    Apr. 13, 2023

Related U.S. Application Data

(63) Continuation of application No. 16/967,477, filed as application No. PCT/EP2019/053199 on Feb. 8, 2019, now Pat. No. 11,442,998.

(30) Foreign Application Priority Data

Feb. 8, 2018   (GB) ..................................... 1802030

(51) Int. Cl.
*G06F 16/93*       (2019.01)
*G06F 16/903*      (2019.01)

(52) U.S. Cl.
CPC ........ *G06F 16/93* (2019.01); *G06F 16/90335* (2019.01)

(58) Field of Classification Search
None
See application file for complete search history.

(56) References Cited

U.S. PATENT DOCUMENTS

| 5,778,364 A | 7/1998 | Nelson |
| 5,890,177 A * | 3/1999 | Moody ................. G06Q 10/10 715/210 |
| 6,014,665 A | 1/2000 | Culliss |
| 6,067,552 A | 5/2000 | Yu |

(Continued)

FOREIGN PATENT DOCUMENTS

| WO | WO 2004/114163 | 12/2004 |
| WO | WO 2007/014341 | 2/2007 |

OTHER PUBLICATIONS

Office Action for EP Application No. 19 704 319.3-1218 dated Jun. 6, 2023.

*Primary Examiner* — Christopher J Raab
(74) *Attorney, Agent, or Firm* — King & Partners, PLC

(57) ABSTRACT

The present disclosure relates to a document comparison system (100) for comparing a first document (D1) with a second document (D2). The first document (D1) includes at least a first section having at least one first section entity (CEn), and the second document (D2) includes at least one second document entity (CEn). The document comparison system includes a processor (110) and a memory device (120). The processor is configured to identify the at least one first section entity (CEn) in the first section of the first document (D1). The processor conducts a search of the second document (D2) to identify the presence or absence of one or more second document entity (CEn) corresponding to or equivalent to each first section entity (CEn) identified in the first section. The present disclosure also relates to a dictionary generating system; a document comparison method; a dictionary populating method; and non-transitory computer-readable medium.

25 Claims, 7 Drawing Sheets

(56) References Cited

U.S. PATENT DOCUMENTS

| | | | |
|---|---|---|---|
| 6,182,068 B1 | 1/2001 | Culliss | |
| 6,289,342 B1 | 9/2001 | Lawrence et al. | |
| 8,843,536 B1 | 9/2014 | Elbaz et al. | |
| 9,619,457 B1 | 4/2017 | Gillick et al. | |
| 10,095,747 B1* | 10/2018 | Rajpara | G06F 16/24575 |
| 2006/0101327 A1* | 5/2006 | Mandelbaum | G06Q 30/0236 |
| | | | 715/229 |
| 2013/0204611 A1 | 8/2013 | Tsuchida | |
| 2014/0082003 A1 | 3/2014 | Feldman et al. | |
| 2016/0125169 A1* | 5/2016 | Finn | G06F 16/24578 |
| | | | 707/730 |
| 2017/0300565 A1 | 10/2017 | Calapodescu et al. | |
| 2017/0322930 A1 | 11/2017 | Drew | |
| 2018/0239959 A1* | 8/2018 | Bui | G06F 3/0482 |
| 2021/0157975 A1* | 5/2021 | Gelosi | G06F 40/166 |
| 2021/0209173 A1* | 7/2021 | Thompson | G06F 16/90335 |

* cited by examiner

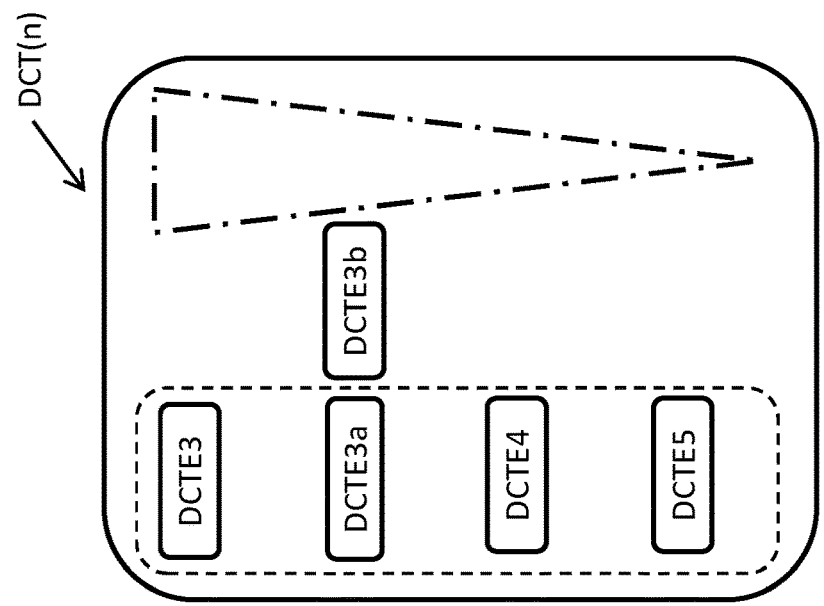
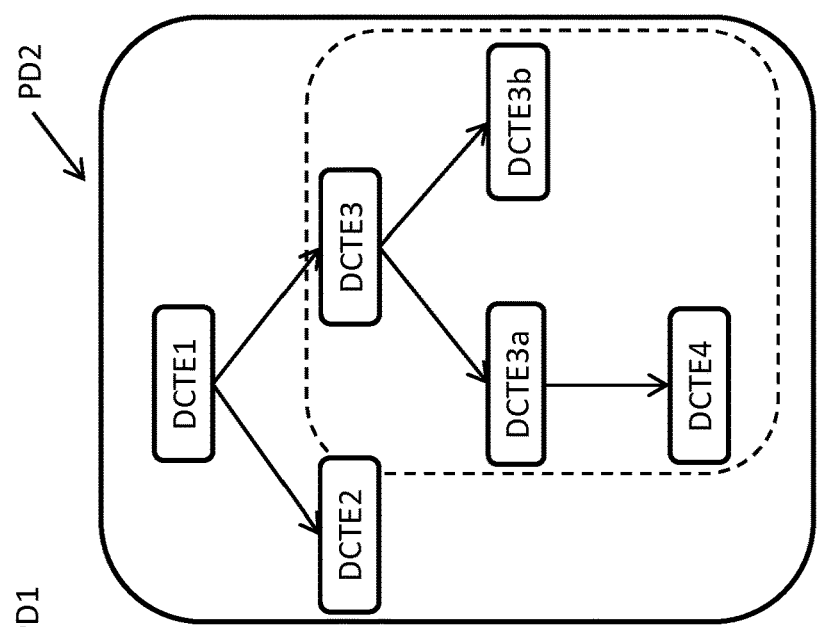
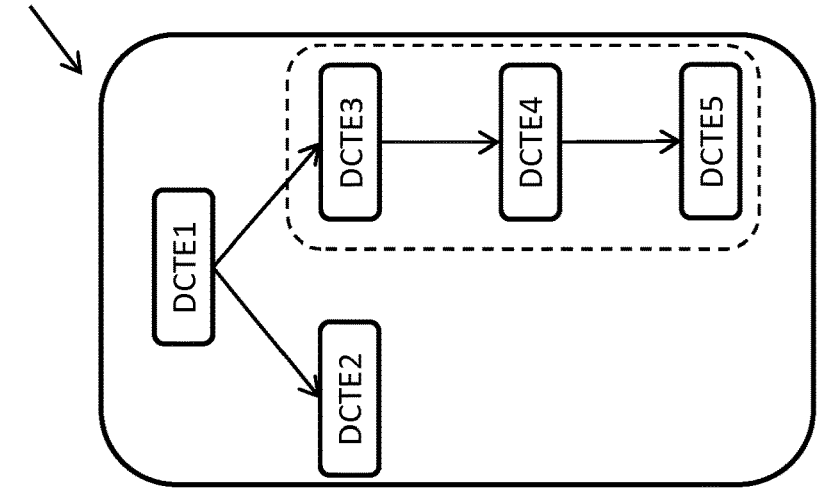
FIG. 4C
FIG. 4B
FIG. 4A

DOCUMENT ANALYSIS METHOD AND APPARATUS

CROSS-REFERENCE TO RELATED APPLICATION(S)

This application is a continuation of U.S. application Ser. No. 16/967,477, entitled "Document Analysis Method and Apparatus," filed Aug. 5, 2020, which is a § 371 national phase of International Application Number PCT/EP2019/053199, filed on Feb. 8, 2019, which claims the benefit of Great Britain Patent Application Number 1802030.5, filed on Feb. 8, 2018— all of which are hereby incorporated herein by reference in their entirety, including all references cited therein.

TECHNICAL FIELD

The present disclosure relates to a document analysis method and apparatus. More particularly, but not exclusively, the present disclosure relates to a method and apparatus for identifying entities and optionally also entity dependencies which are common to different natural language documents. The natural language documents may be technical documents, for example comprising scientific papers and/or patent documents.

BACKGROUND

It is known to use search algorithms to identify the presence or absence of entities (comprising or consisting of key words or key terms) in documents. These search algorithms are commonly employed in the field of patent searching to identify prior art documents which are most relevant to a particular technical innovation. The search algorithms may, for example, rank the documents based on a determined relevance to the search terms. The entities identified in each patent document may be highlighted to aid review by a user, such as a patent attorney or patent examiner. It has been recognised that using machine learning and natural language processing (NLP) techniques, the comparison of documents could be developed to provide additional insights. The present invention(s) has been conceived against this background.

SUMMARY OF THE INVENTION

Aspects of the present invention relate to a document comparison system, a dictionary generating system, a method of comparing documents, a method of generating a dictionary, and a non-transitory computer-readable medium as claimed in the appended claims.

According to a further aspect of the present invention there is provided a document comparison system for comparing a first document with a second document, the first document having at least a first section comprising at least one first section entity, and the second document having at least one second document entity;
  the document comparison system comprising a processor and a memory device; wherein the processor is configured to:
  identify the at least one first section entity in the first section of the first document; and
  conduct a search of the second document to identify the presence or absence of one or more second document entity corresponding to or equivalent to each first section entity identified in the first section. In dependence on the results of the search in respect of the second document, the document comparison system may indicate one or more of the at least one first section entity having a corresponding or equivalent second document entity. The document comparison system may thereby determine which of the at least one first section entity is known from the second document and which of the at least one first section entity is not known from the second document. The document comparison system is provided to identify and extract entities from the first and second documents. The extracted entities are then compared to determine whether there are corresponding or equivalent entities in both documents. The document comparison system may thereby determine relationships between the first and second documents. At least in certain embodiments, the document comparison system may identify entity dependencies which define the relationship between the entities in the first and second documents. The entity dependencies in the first and second documents may also be compared to provide additional insights.

The processor may be configured to search a first dictionary to identify one or more first dictionary entity corresponding to each first section entity. The processor may be configured to conduct a search of the second document to identify the presence or absence of one or more second document entity corresponding to each first dictionary entity. The dictionary may comprise a hierarchical model defining a ranked order of the first dictionary entities. The processor may be configured to conduct a search of the second document to identify the presence or absence of one or more first dictionary entity having an order which is substantially equal to or less than the order of the first section entity.

The first document may be a patent document. The first section may comprise or consist of one or more patent claims, each first section entity may be a claim entity.

The first document may have a second section comprising at least one second section entity. The processor may be configured to identify one or more second section entity corresponding to each first section entity identified in the first section.

The processor may be configured to conduct a search of the second document to identify the presence or absence of one or more second document entity corresponding to or equivalent to each second section entity.

The processor may be configured to search a dictionary to identify one or more second dictionary entity corresponding to each second section entity. The processor may be configured to conduct a search of the second document to identify the presence or absence of one or more second document entity corresponding to or equivalent to the one or more second dictionary entity. The dictionary may comprise a hierarchical model defining a ranked order of the dictionary entities. The processor may be configured to conduct a search of the second document to identify the presence or absence of one or more second dictionary entity having an order which is substantially equal to or less than the order of the second section entity.

The first document may be a patent document. The second section may comprise a description. The description may comprise or consist of a specific description and/or a set of statements of invention. Each second section entity may be a description entity. The processor may be configured to determine a framework defining a relationship between the second section entities.

The processor may be configured to determine a first framework defining one or more first entity dependency between the first section entities.

The processor may be configured to determine a second framework defining one or more second entity dependency between the second document entities.

The processor may be configured to compare the first and second frameworks to assess a correlation between the first section entities and the second document entities. The comparison of the first and second frameworks may comprise comparing the entity dependencies between the first section entities in the first framework and corresponding second document entities in the second framework.

According to a further aspect of the present invention there is provided a document comparison system for comparing a first document with a second document, the first document comprising at least one first document entity, and the second document having at least one second document entity;

the document comparison system comprising a processor and a memory device; wherein the processor is configured to:
determine a first framework defining one or more first entity dependency between the first document entities;
determine a second framework defining one or more second entity dependency between the second document entities; and
compare the first and second frameworks to assess a correlation between the first document entities and the second document entities.

The comparison of the first and second frameworks may comprise comparing the entity dependencies between the first document entities in the first framework and corresponding second document entities in the second framework.

The one or more first entity dependency and/or the one or more second entity dependency may each comprise one or more of the following: syntactic relations; subject/verb entity dependencies; verb/object entity dependencies; compound nouns; nominal modifiers of nouns; clausal predicates; temporal nominal modifiers; adjectives; and possessives.

According to a further aspect of the present invention there is provided a dictionary generating system for analysing at least one document to populate a dictionary; the dictionary generating system comprising a processor and a memory device; wherein the processor is configured to:
identify at least first and second entities in a first document;
populate the dictionary with said first and second entities;
parse the first document to identify a first relationship between the first and second entities; and
infer an order of the first and second entities relative to each other in dependence on the first relationship between the first and second entities. The inferred order of the first and second entities may be stored, for example in the dictionary or in a look-up table.

The parsing of the first document may comprise identifying at least one entity dependency between the first and second entities and identifying the first relationship in dependence on said at least one entity dependency.

The first relationship may define a structural or functional relationship between the first and second entities.

The processor may be configured to identify at least third and fourth entities in a second document; and populate the dictionary with said third and fourth entities. The processor may parse the second document to identify a second relationship between the third and fourth entities; and infer an order of the third and fourth entities relative to each other in dependence on the second relationship between the third and fourth entities. The inferred order of the third and fourth entities may be stored, for example in the dictionary or in a look-up table.

The parsing of the second document may comprise identifying at least one entity dependency between the third and fourth entities and identifying the second relationship in dependence on said at least one entity dependency.

The second relationship may define a structural or functional relationship between the first and second entities.

The processor may be configured to determine if one of the first and second entities corresponds to or is equivalent to one of the third and fourth entities. The processor may infer an order of the first, second, third and fourth entities in dependence on the first and second relationships.

The processor may be configured to reference a predetermined dictionary to determine if one of the first and second entities corresponds to or is equivalent to one of the third and fourth entities.

The inferred order of the first and second entities and/or the inferred order of the third and fourth entities may be used to form a hierarchical model in the dictionary.

According to a further aspect of the present invention there is provided a method of comparing a first document with at least a second document, the first document comprising at least a first section; the method comprising:
identifying the at least one first section entity in the first section of the first document; and
conducting a search of the second document to identify the presence or absence of one or more second document entity corresponding to or equivalent to each first section entity identified in the first section.

The method may comprise searching a dictionary to identify one or more first dictionary entity corresponding to each first section entity. The method may comprise conducting a search of the second document to identify the presence or absence of one or more second document entity corresponding to each first dictionary entity. The dictionary may comprise a hierarchical model defining a ranked order of the first dictionary entities. The method may comprise conducting a search of the second document to identify the presence or absence of one or more first dictionary entity having an order which is substantially equal to or less than the order of the first section entity.

The first document may be a patent document. The first section may comprise one or more patent claims. Each first section entity may be a claim entity.

The first document may have a second section comprising at least one second section entity. The method may comprise identifying one or more second section entity corresponding to each first section entity identified in the first section.

The method may comprise conducting a search of the second document to identify the presence or absence of one or more second document entity corresponding to or equivalent to each second section entity.

The method may comprise searching a dictionary to identify one or more second dictionary entity corresponding to each second section entity. The method may comprise conducting a search of the second document to identify the presence or absence of one or more second document entity corresponding to or equivalent to the one or more second dictionary entity. The dictionary may comprise a hierarchical model defining a ranked order of the dictionary entities. The method may comprise conducting a search of the second document to identify the presence or absence of one or more second dictionary entity having an order which is substantially equal to or less than the order of the second section entity.

The first document may be a patent document. The second section may comprise a description. The description may comprise or consist of a specific description and/or a set of statements of invention. Each second section entity may be a description entity.

The method may comprise determining a first framework defining one or more first entity dependency between the first section entities. The method may comprise determining a second framework defining one or more second entity dependency between the second document entities. The method may comprise comparing the first and second frameworks to assess a correlation between the first section entities and the second document entities.

The comparison of the first and second frameworks may comprise comparing the entity dependencies between the first section entities in the first framework and corresponding second document entities in the second framework.

According to a further aspect of the present invention there is provided a method of comparing a first document with a second document, the first document comprising at least one first document entity, and the second document having at least one second document entity; wherein the method comprises:
 determining a first framework defining one or more first entity dependency between the first document entities;
 determining a second framework defining one or more second entity dependency between the second document entities; and
 comparing the first and second frameworks to assess a correlation between the first document entities and the second document entities.

The comparison of the first and second frameworks may comprise comparing the entity dependencies between the first document entities in the first framework and corresponding second document entities in the second framework.

The one or more first entity dependency and/or the one or more second entity dependency may each comprise one or more of the following: syntactic relations; subject/verb entity dependencies; verb/object entity dependencies; compound nouns; nominal modifiers of nouns; clausal predicates; temporal nominal modifiers; adjectives; and possessives.

According to a further aspect of the present invention there is provided a method of analysing at least one document to populate a dictionary; wherein the method comprises:
 identifying at least first and second entities in a first document;
 populating the dictionary with said first and second entities;
 parsing the first document to identify a first relationship between the first and second entities; and
 inferring an order of the first and second entities relative to each other in dependence on the first relationship between the first and second entities. The method may comprise recording the inferred order of the first and second entities.

The parsing of the first document comprises identifying at least one entity dependency between the first and second entities and identifying the first relationship in dependence on said at least one entity dependency.

The first relationship may define a structural or functional relationship between the first and second entities.

The method may comprise identifying at least third and fourth entities in a second document; and populating the dictionary with said third and fourth entities. The method may comprise parsing the second document to identify a second relationship between the third and fourth entities; and inferring an order of the third and fourth entities relative to each other in dependence on the second relationship between the third and fourth entities. The method may comprise recording the inferred order of the third and fourth entities.

The parsing of the second document may comprise identifying at least one entity dependency between the third and fourth entities and identifying the second relationship in dependence on said at least one entity dependency.

The second relationship may define a structural or functional relationship between the first and second entities.

The method may comprise determining if one of the first and second entities corresponds to or is equivalent to one of the third and fourth entities; and to infer an order of the first, second, third and fourth entities in dependence on the first and second relationships.

The method may comprise referencing a predetermined dictionary to determine if one of the first and second entities corresponds to or is equivalent to one of the third and fourth entities.

The inferred order of the first and second entities and/or the inferred order of the third and fourth entities may be used to form a hierarchical model in the dictionary.

According to a further aspect of the present invention there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the entity "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIGS. 4A, 4B and 4C illustrate the formation of a hierarchical model of dictionary entities identified in first and second patent documents in a text corpus;

DETAILED DESCRIPTION

Figure 1:
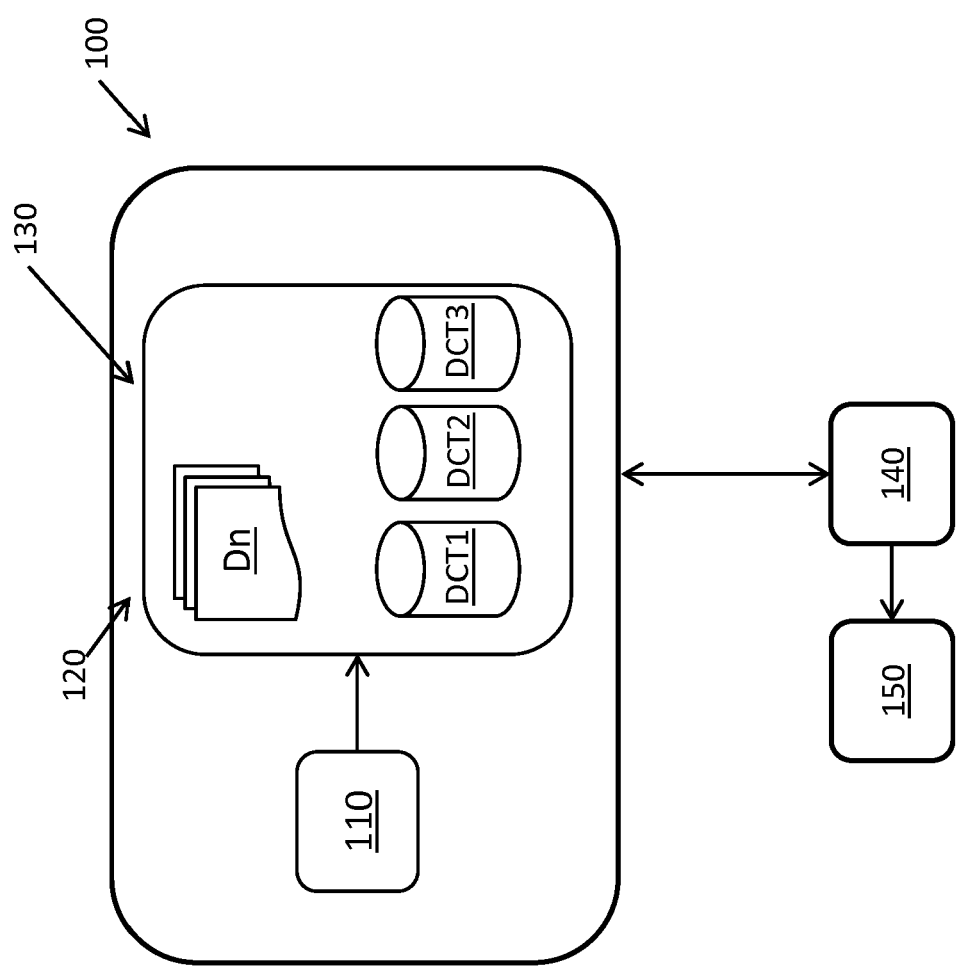
FIG. 1 shows a schematic representation of a document comparison system in accordance with an embodiment of the present invention.

The present invention relates to a document comparison system 100 configured to compare the contents of a first document D1 with at least a second document D2. A schematic representation of the document comparison system 100 is shown in FIG. 1.

The document comparison system 100 is operable to compare a section of the first document D1 with the content of the second document D2. At least in certain embodiments, the document comparison system 100 is operative to assess the correlation between the section of the first document D1 with the contents of the second document D2. In the present embodiment, the first document D1 is a first patent document; and the second document D2 is a second patent document. As described herein, the first and second documents D1, D2 each comprise a set of claims CL and a specific description DC. The section of the first document D1 comprises a set of claims CL(n) of the first document D1. The set of claims CL(n) comprises at least one claim CLn. The document comparison system 100 is configured to compare the contents of each claim CLn in the first document D1 with the disclosure of the second document D2 to facilitate assessment of the patentability of the claim CLn. The composition of a patent document and the assessment of patentability will now be described by way of background.

A patent document defines technical subject matter which represents an invention. The invention may be defined as one or more of the following: a product, a process or a method. A patent application is classified by technical subject matter, for example using a hierarchical system such as the International Patent Classification (IPC), to facilitate searching and analysis. The patent document typically comprises an introduction, a series of statements setting out features of the invention (also known as the "statements of invention"), a specific description setting out a detailed description of at least one embodiment of the invention; a set of claims (comprising one or more claims); and an abstract. The patent document is referred to as a patent application prior to grant; and as a granted patent after grant. The specific description describes at least one embodiment of the invention. The claim set comprises at least one independent claim and optionally one or more dependent claim (which refers onto one or more other claims). The independent claim defines the essential features of the invention; and the dependent claims define additional features that may be incorporated into the invention. The claims are in the form of numbered paragraphs and, depending on the jurisdiction, the dependent claims may refer to one or more other claims.

The claims each comprise one or more clauses, each clause forming a syntactic construction containing a subject and predicate. The clause may form part or all of a sentence. The predicate is a syntactic unit consisting of a verb, which may agree with the subject in number, and of all the words governed by the verb or modifying it. Each clause comprises one or more entity defining a constituent component or feature of the invention.

The claims define the scope of protection conferred by the granted patent. The patent application undergoes search and examination by the relevant Intellectual Property Offices to assess patentability (i.e. to determine if the claims relate to subject matter which is novel and inventive). The search conducted by the Intellectual Property Office is intended to identify published documents (referred to herein as prior art documents), which may include other patent documents, relevant to the assessment of patentability. The examination process is then undertaken to determine whether the invention defined by the claims of the patent application is novel and inventive (also known as obviousness) over the prior art documents. When construing patent documents, the entities "comprising" and "including" are non-exhaustive in many jurisdictions and indicate that other features may also be present. In contrast, the entity "consist" is generally understood as being exhaustive such that other features are not present.

The assessment of novelty comprises determining whether each of the terms recited in a claim are disclosed in a single prior art document (or a single embodiment disclosed in a prior art document). The assessment of inventive step comprises determining whether it would have been obvious for a person skilled in the art to provide all of the terms recited in a claim. The assessment of inventive step may comprise combining the teaching of two or more prior art documents. The document comparison system 100 described herein has particular application in assessing novelty, but may also facilitate assessment of inventive step. The document comparison system 100 may be used for analysis of a claim of a patent application, for example to assess patentability. Alternatively, or in addition, the document comparison system 100 may be used for analysis of a claim of a granted patent, for example to assess validity or infringement.

The document comparison system 100 can comprise one or more controllers. It is to be understood that the or each controller can comprise a control unit or computational device having one or more electronic processors (e.g., a microprocessor, a microcontroller, an application specific integrated circuit (ASIC), etc.), and may comprise a single control unit or computational device, or alternatively different functions of the or each controller may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller to implement the control techniques described herein (including some or all of the functionality required for the method described herein). The set of instructions could be embedded in said one or more electronic processors of the controller; or alternatively, the set of instructions could be provided as software to be executed in the controller. A first controller or control unit may be implemented in software run on one or more processors. One or more other controllers or control units may be implemented in software run on one or more processors, optionally the same one or more processors as the first controller or control unit. Other arrangements are also useful.

As shown in FIG. 1, the document comparison system 100 comprises a processor 110 connected to a memory device 120. A database 130 is stored on the memory device 120 and is accessed by the processor 110. The processor 110 is an electronic processor configured to execute a set of computational instructions stored in the memory device 120. When executed, the computational instructions cause the electronic processor 110 to perform the method(s) described herein. The document comparison system 100 may be executed on a general purpose computational device, such as a desktop personal computer.

In the present embodiment, however, the document comparison system 100 is implemented over a communications network. The processor 110 and memory device 120 form part of a server which is accessed from a computer terminal 140 having a display screen 150. The document comparison system 100 according to the present embodiment provides cloud-based analysis. A user may interact with the document comparison system 100 using a portal on the computer terminal 140, for example accessed by a web browser. In use, the first and second documents D1, D2 may be uploaded to the document comparison system 100. The analysis of the first and second documents D1, D2 is performed by the processor 110 and the results transmitted to the computer terminal 140.

The electronic processor 110 is provided in the one or more controller. The electronic processor 110 has one or more electrical input(s) for receiving one or more (input signal(s)), and one or more electrical output(s) for outputting one or more (output signal(s)). The or each controller further comprises at least one memory device 120 electrically coupled to the at least one electronic processor 110 and having instructions stored therein. The at least one electronic processor 110 is configured to access the at least one memory device 120 and execute the instructions thereon so as to perform the method(s) described herein.

The, or each, electronic processor 110 may comprise any suitable electronic processor (e.g., a microprocessor, a microcontroller, an ASIC, etc.) that is configured to execute electronic instructions. The, or each, electronic memory device 120 may comprise any suitable memory device and may store a variety of data, information, threshold value(s), lookup tables or other data structures, and/or instructions therein or thereon. In an embodiment, the memory device 120 has information and instructions for software, firmware, programs, algorithms, scripts, applications, etc. stored therein or thereon that may govern all or part of the methodology described herein. The processor, or each, electronic processor 110 may access the memory device 120 and execute and/or use that or those instructions and information to carry out or perform some or all of the functionality and methodology describe herein.

The at least one memory device 120 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers have been described comprising at least one electronic processor 110 configured to execute electronic instructions stored within at least one memory device 120, which when executed causes the electronic processor(s) 110 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Identification and Extraction of Entities

The document comparison system 100 is operative to identify and extract entities recited in each of the first and second documents D1, D2. The term entity is used herein to refer to a key term (i.e. a term identified as having a significant meaning in context of the document) Each entity may comprise or consist of one word, or a plurality of words. The entities may comprise a noun, a noun group (also known as a noun phrase) or a noun substitute. The entities identified in the first and second documents D1, D2 may optionally also comprise one or more of the following: a pronoun, a preposition, an adverb, a verb and an adjective. The document comparison system 100 implements an entity recognition algorithm to identify the entities in the first and second document D1, D2. The entity recognition algorithm may implement statistical analysis, for example comprising occurrence frequency to identify one or more entity occurring within the first and second documents D1, D2. The entities typically each define a particular feature or component within the first and second documents D1, D2. The entities may be identified in the claims and/or the statements of invention and/or the specific description of the patent document. A distinction is made herein depending on the location of the entities within the patent document. The entities identified in the claims of the patent document are referred to herein as "claim entities" (denoted generally herein by the reference numeral CEn, where n is a whole number differentiating between the respective entities); and the entities recited in the statements of invention or the specific description of the patent document are referred to herein as "description entities" (denoted generally herein by the reference numeral DEn, where n is a whole number differentiating between the respective entities).

Figure 3:
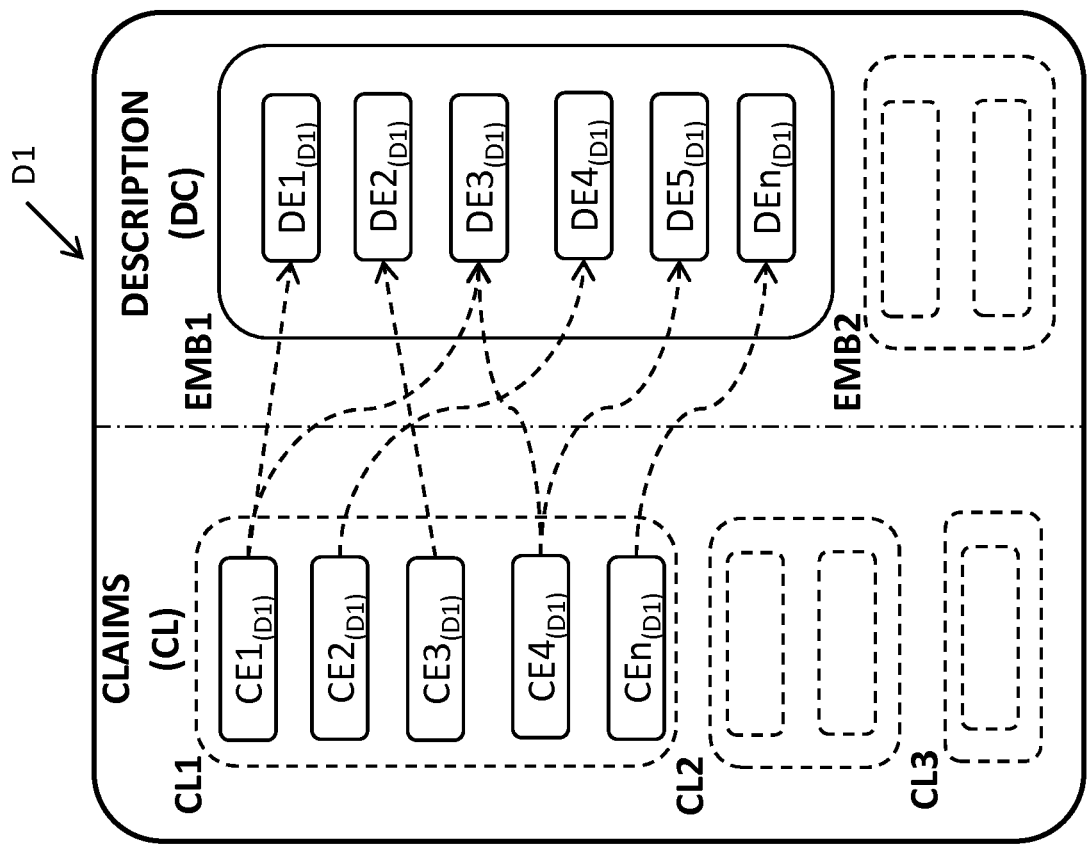
FIG. 3 shows a schematic representation of the relationships between the claim entities and the description entities identified in the first document.
Figure 2:
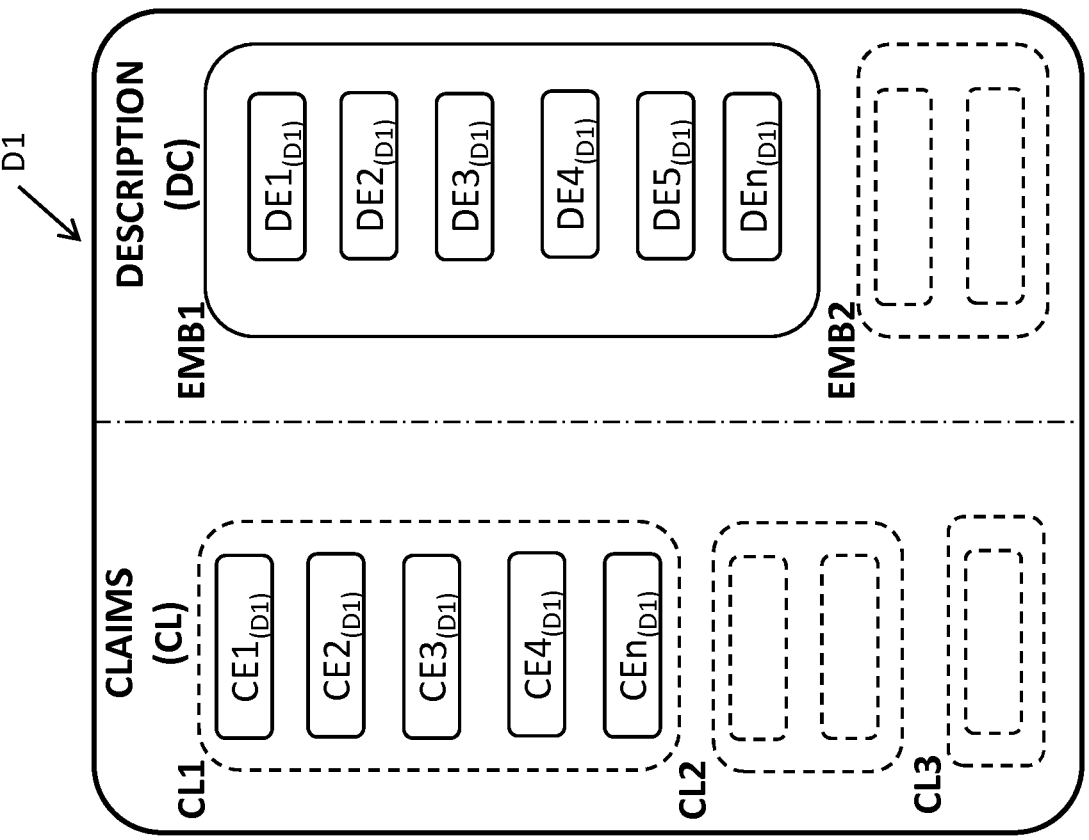
FIG. 2 shows a schematic representation of the claim entities and description entities identified in a first patent document.

The identification and extraction of claim entities CLn and description entities DEn from the first document D1 is illustrated in FIGS. 2 and 3. In a first parsing operation, the document comparison system 100 identifies the claim entities Cen. The claim entities CEn may, for example, be identified as those entities introduced in the claims using the indefinite article ("a" or "an"); this analysis is particularly effective in reviewing patent claims in view of the rigorous language format commonly adopted in patent applications. The document comparison system 100 analyses the claim entities CEn identified using this technique to determine whether each entity is singular or plural. The document comparison system 100 may, for example, identify phrases such as "at least one" or "one or more". The claim entities CEn may define a feature or component by virtue of the function to be performed, for example in the form "means for performing function X" (so-called "means plus function" language). The document comparison system 100 may identify claim entities CEn using this language format (or an equivalent structure, such as "configured to" or "adapted to") and characterise them based on the stated function. Alternatively, or in addition, the document comparison system 100 may identify the claim entities CEn relating to one or more entities in the complete patent application. In a second parsing operation, the document comparison system 100 identifies one or more description entities DEn in the specific description or the statements of invention. The description entities DEn may be identified, for example, through statistical analysis of the specific description. As illustrated in FIG. 3, the second parsing operation may comprise identifying one or more description entities DEn corresponding to each of the claim entities CEn. The document comparison system 100 may, for example, conduct a search of the specific description and the statements of invention of the first document D1 to identify occurrences of each claim entity CEn. The description entities DEn may, for example, be identified based on their proximity to other words in the specific description.

The terminology used in the claim entities CEn may not correspond directly to the terminology used in the other sections of the patent document, for example the specific description. The different terminology may, for example, arise due to the claims seeking to define the invention in broad entities, rather than define specific features. This may adversely affect a comparison of the claim entities CEn recited in the first document D1 with the specific description of the second document D2. In order to improve the accuracy of the search, the document comparison system 100 implements language processing techniques further to define each claim entity CEn recited in the claims of the first document D1. In particular, the document comparison system 100 searches the statements of invention and/or the specific description of the first document D1 to identify one or more description entity DEn relating to each claim entity CEn. The relationship between each entity CEn and each description entity DEn is stored. The relationship between the claim entities CEn and the description entities DEn is illustrated by dashed lines in FIG. 3.

In order to identify entities related to the claim entities CLn, the document comparison system 100 may be configured to perform a proximity search of the first document D1 to identify entities which are used in proximity to the claim entities CEn elsewhere in the first document D1 (for example, in the statements of invention and/or the specific description and/or the claims). The document comparison system 100 may be configured to identify description entities DEn occurring before and/or after the claim entity CEn. Alternatively, or in addition, the document comparison system 100 may seek to identify language indicating that the claim entity CEn relates to other entities identified in the first document D1 (other claim entities Cen and/or description entities DEn). For example, the document comparison system 100 may seek to identify language in the first document D1 specifying that an identified claim entity CEn "is", "comprises", "consists of" or is "composed of" one or more other description entities. As described herein, the description entities identified through this analysis are subsequently used as search terms for searching the second document D2. The search of the second document D2 may be performed in respect of each of the claim entities CEn and/or the description entities identified in the first document D1. Furthermore, the document comparison system 100 may repeat the search of the second document D2 for synonyms of the claim entities CEn and/or the description entities. The synonyms may be accessed from a standard reference dictionary stored in the database 130.

The first and second documents D1, D2 each comprise one or more claims CLn. The claims CLn may be identified automatically by identifying a heading, for example comprising "CLAIMS", and/or a sequence of numbered paragraphs. The claims may be analysed to identify claim entities CEn in each of the first and second documents D1, D2. The claims each comprise one or more clause; each clause comprising one or more claim entity CEn. The document comparison system 100 is configured to subdivide each claim into said one or more clause. Each clause may be identified by subdividing the claim based on one or more of the following: punctuation, paragraph structure, line breaks (for example, identification of a hard return or a soft return), tabulation (for example, identification of a tab insert), and sentence structure. The document comparison system 100 may subdivide each claim based on one or more of the following punctuation marks: a semicolon, a colon, a comma or a full stop (period).

The document comparison system 100 may implement natural language processing (NLP) techniques to identify co-references and/or entity dependencies between entities identified in the first document D1; and also between entities identified in the second document D2. The co-references and/or entity dependencies may be identified between the claim entities CEn within each clause and/or between claim entities CEn in different clauses of each claim of the first document D1. The entity dependencies may comprise one or more of the following: syntactic relations; subject/verb entity dependencies; verb/object entity dependencies; compound nouns; nominal modifiers of nouns; clausal predicates; temporal nominal modifiers; adjectives; possessives; etc. The document comparison system 100 may implement corresponding natural language processing (NLP) techniques to identify co-references and/or entity dependencies of the description entities in the description of the second document D2.

The document comparison system 100 is configured to perform semantic analysis of each claim CLn to identify co-references and entity dependencies between the claim entities CEn in the first document D1. The entity dependencies may, for example, identify first and second claim entities CEn as being a subject and an object respectively, optionally also identifying a term, such as a verb, defining an entity dependency between the first and second claim entities CEn. The semantic analysis may, for example, identify the entity dependencies between two or more claim entities CEn in the same clause or in different clauses. The semantic analysis may also identify the entity dependencies between two or more claim entities CEn in different claims. A user may optionally specify an entity dependency between claim entities CEn, for example by linking two or more claim entities CEn in the same claim or in different claims. In addition, the analysis may seek to identify entity dependencies between different claim entities CEn recited in the claim.

The document comparison system 100 may be configured to identify ordinal indicators, for example indicating a sequence in which clauses and/or claim entities CEn are recited in the claim CLn as this may indicate a particular temporal order in which the clauses are to be applied. The sequence may be specified by a temporal indicator, such as "then", "after" or "following"; or by the sequence in which the clauses and/or the claim entities CEn are recited in the claims. The comparison of the first and second documents D1, D2 may seek to identify clauses and/or claim entities CEn presented in the same order. When analysing the second document D2, the document comparison system 100 may seek to identify claim entities CEn and clauses which are presented in the order determined through analysis of the claim. This may be relevant when assessing whether a method or process reciting a particular sequence of steps is anticipated by the second document D2.

Dictionary Model

The document comparison system 100 references one or more dictionary DCT(n) when comparing the first and second documents D1, D2 to take account of inherent differences in language and terminology. The dictionary DCT(n) is a custom dictionary which may be generated by the document comparison system 100 or by a dictionary generating system. The dictionary DCT(n) comprises a plurality of entities derived from processing of a plurality of natural language documents stored in a text corpus. The dictionary DCT(n) may comprise a multi-dimensional matrix in which the entities extracted from the text corpus are stored. The text corpus may be stored in a database on the memory device 130 or a storage device accessible to the processor 120. In the present embodiment, the text corpus comprises a plurality of patent documents PDn, including patent applications and/or granted patents. The text corpus may, for example, be formed from a database of patent documents, for example made available through a commercial licensing agreement. The patent documents may be published patent applications and/or granted patents. Alternatively, or in addition, the database may comprise or consist of a user's published and/or unpublished patent documents to enable the user to customise the dictionary DCT(n). The one or more dictionary DCT(n) may be used in conjunction with a standardised language dictionary. For example, the dictionary DCT(n) may be used in combination with a dictionary providing synonyms and/or definitions.

Each dictionary DCT(n) may be customised to relate to a selected technical field or a group of related technical fields. For example, the dictionary DCT(n) may be compiled through processing of patent documents identified as being in one or more predefined category of the IPC. In the present embodiment, the document comparison system 100 is configured to compile a plurality of dictionaries DCT(n), each of said dictionaries DCT(n) relating to a particular technical field. The technical fields may, for example, correspond to one or more classification categories allocated to each patent document, for example under the IPC. The document comparison system 100 is configured to compile the dictionaries DCT(n) by identifying and extracting entities recited in the patent documents in the text corpus. The identified entities are lexical items each consisting of a single word or a plurality of words (for example in the form of a chain). Each entity relates to a particular feature, component or process recited in the patent documents. By way of example, each entity may define one or more of the following: a system, a sub-system, an assembly, a sub-assembly, a component, an element, process step or operating condition. As illustrated in FIG. 3, the extracted entities are stored in the dictionary DCT(n) as a plurality of dictionary entities DCTEn. The dictionary entities DCTEn may be independent of each other or may be linked, for example to indicate a relationship between the dictionary entities DCTEn.

As outlined above, the entities identified in the claims of the patent document are referred to herein as claim entities CEn; and the entities recited in the statements of invention or the specific description of the patent document are referred to herein as description entities DEn. The claim entities CEn may be identified as those terms introduced in the claims using the indefinite article ("a" or "an"). Similarly, the description entities may be identified as those terms introduced in the claims using the indefinite article ("a" or "an"). Alternatively, or in addition, the claim entities CEn and the description entities may be identified by statistical analysis of each patent document, for example to identify terms which occur with the highest frequency. The document comparison system 100 may also perform semantic analysis of the patent documents, for example by applying natural language processing (NLP) and machine learning techniques. By developing the dictionaries DCT(n) from a text corpus comprising patent documents, the entities are well suited for analysis of the first and second documents D1, D2.

The document comparison system 100 identifies entity dependencies between the entities identified within each patent document. The entity dependencies are used to develop a hierarchical model within each dictionary DCT(n). An order (rank) of the entities is inferred from the analysis of the patent documents to provide an indication of a relative scope (breadth) of each entity, thereby forming the hierarchical model. The relationship between entities may also be identified through statistical and/or contextual analysis of each patent document, for example to provide an indication of context for each entity and/or an indication of the likelihood of entities being used in conjunction with each other. The rigorous application of language in patent documents facilitates this form of analysis. The formation of the hierarchical model will now be described, by way of example, with reference to a plurality of entities (referenced as a first entity, a second entity, a third entity and so on) contained in a single patent document. The process is performed in respect of each patent document in the text corpus and the results then compiled to form the hierarchical model.

The first and second entities are classified as being of the same order in the hierarchical model if they are identified as being equivalent to each other. The patent document can be analysed to identify the first and second entities in the same sentence or clause along with an entity dependency (such as a verb or other syntactic construct) indicating that the first and second entities are equivalent to each other. For example, the analysis of the text corpus may identify instances where the first entity is defined as "consisting of", "being [in the form of]" or "is" the second claim entity CEn. Other terms and entity dependencies may be convey the same meaning. Similarly, if the first and second entities are identified as forming part of a third entity (e.g. the third entity "comprises" or "consists of" the first and second entities) or as alternative implementations of a third entity (e.g. the third entity "comprises" or "consists of" the first entity of the second entity), the first and second entities are classified as being of the same order in the hierarchical model. It will be appreciated that the second entity may be included in a list of entities, so the search may be extended to identify the second entity in proximity to the verb. For example, the search will look to identify the second entity within a predetermined number of words of the verb or within the same clause, sentence or paragraph. The search may seek to identify the second entity in the same sentence as the verb but occurring after the verb.

The first entity is classified as a higher order than the second entity if the second entity is identified as forming part of the first entity (i.e. the first entity has a broader meaning or scope than the second entity). The patent document can be analysed to identify the first and second entities in the same clause or sentence along with a verb (which may be a predefined phrase, an entity or a symbol) indicating that the second entity forms part of the first entity. For example, the analysis of the text corpus may identify instances where the first entity is defined as "comprising" or "including" the second entity. Other terms may be used to convey the same meaning. It will be appreciated that the second entity may be included in a list of entities, so the search may be extended to identify the second entity in proximity to the verb. For example, the search will look to identify the second entity within a predetermined number of words of the verb or within the same clause, sentence or paragraph. The search may seek to identify the second entity in the same sentence as the verb but occurring after the verb. When analysing the claims, the initial claim entity CEn introduced in an independent claim, is classified as having a higher order than the other claim entities CEn recited in that claim set. For example, if the claim is directed to "An apparatus . . . ", the initial claim entity CEn identified is the "apparatus" which is classified as having a higher order than the subsequent claim entities CEn. The claim entities CEn identified in the dependent claims may be classified as having progressively lower orders.

The first entity is classified as a lower order entity than the second entity if the first entity is identified as forming part of the second entity (i.e. the first entity has a narrower meaning or scope than the second entity). The patent document can be analysed to identify the first and second entities in the same sentence or clause along with a verb (which may be a predefined phrase, an entity or a symbol) indicating that the first entity forms part of the second entity. For example, the analysis of the text corpus may identify instances where the first entity is defined as "forming part of" or "being a component of" the second entity. Other terms may be used to convey the same meaning. It will be appreciated that the second entity may be included in a list of entities, so the search may be extended to identify the second entity in proximity to the verb. For example, the search will look to identify the second entity within a predetermined number of words of the verb or within the same clause, sentence or paragraph. The search may seek to identify the second entity anywhere in the clause or sentence after the verb.

The above processes may be repeated for a plurality of entities identified in each patent document. For example, each entity may be defined as comprising one or more additional entities; and/or as forming part of another entity. For example, the second entity may be defined as comprising a third entity. The third entity is classified as having a lower order than the second entity. Conversely, the first entity may be defined as forming part of a fourth entity. In this scenario, the fourth entity is classified as having a higher order than the first entity.

The document comparison system 100 performs ranking of the entities across multiple patent documents to compile the hierarchical model. The frequency with which a particular ranking is identified can be used to rank related entities in the dictionary DCT(n). As noted above, the construction of patent documents may vary between different jurisdictions. The document comparison system 100 may be configured to reflect different principles of patent construction in different jurisdictions.

The resulting hierarchical model ranks the entities in dependence on their usage within the patent documents. This process is repeated for a plurality of patent documents to compile the hierarchical model. The usage of entities will invariably differ in different patent documents, but by considering a sufficiently large number of patent documents an indication of the relative meaning of the entities is established. It will be understood that the hierarchical model may be dynamic, for example updated to identify new entities and to reflect changes in the meaning of the entities, for example as the text corpus is updated to include new patent documents. Furthermore, as described herein, the hierarchical model may apply different weightings depending on the type of patent document. By way of example, an entity and/or entity dependency extracted from a granted patent may have a weighting allocated which is greater than a weighting allocated for an entity and/or an entity dependency extracted from a pending patent application.

The formation of the hierarchical model is illustrated in FIGS. 4A, 4B and 4C. In the illustrated example, the text corpus comprises first and second patent document PD1, PD2 which are in the same technical field. The first patent document PD1 is analysed and a plurality of first dictionary entities PDEn identified, as illustrated in FIG. 4A. The second patent document PD2 is analysed and a plurality of second dictionary entities PDEn identified, as illustrated in FIG. 4B. The dictionary DCT(n) is formed by combining the dictionary entities DCTEn identified and extracted from both the first and second patent documents PD1, PD2, as illustrated in FIG. 4C. In the illustrated example, the first and second patent documents PD1, PD2 include common dictionary entities (DCTE3 and DCTE4). However, the second patent document PD2 also recites intermediary dictionary entities (DCTE3a, DCTE3b). The dictionary DCT(n) is compiled to introduce the intermediary dictionary entities (DCTE3a, DCTE3b), thereby offsetting subsidiary dictionary entities. The resulting hierarchical model provides an indication of the relative meaning of the dictionary entities DCTEn. As represented schematically by the triangle in FIG. 4C, the dictionary entities DCTEn are ranked in the hierarchical model such that each dictionary entity DCTEn is broader than any dictionary entities DCTEn disposed at a lower position in the hierarchical model.

The hierarchical model could be formed exclusively by analysing the claim entities CEn. However, using both the claim entities CEn and the description entities enables formulation of a more comprehensive language model. The identification of the claim entities CEn may be performed in an initial operation and used as a starting point for identification and classification of the description entities. The associative links described herein define links between the claim entities CEn and the description entities. The hierarchical model would include a marker to differentiate between description entities and claim entities CEn.

Thus, for a given technical field, the document comparison system 100 compiles one or more dictionary DCT(n) comprising entities identified in the patent documents in the text corpus. Each dictionary DCT(n) comprises a hierarchical model of the entities. It will be understood that two or more of the dictionaries DCT(n) may be combined, for example to form a global dictionary. Alternatively, or in addition, entities in different dictionaries DCT(n) may be linked with each other. The document comparison system 100 may compile a global dictionary which may be subdivided in dependence on technical field.

It will be understood that the relative ranking of entities may be adjusted by user inputs. The user inputs may be stored and may be used to alter the ranking of entities for that user (i.e. local rankings); or may be used to alter the ranking of entities for all users (i.e. global rankings).

Associative Link

Figure 5:
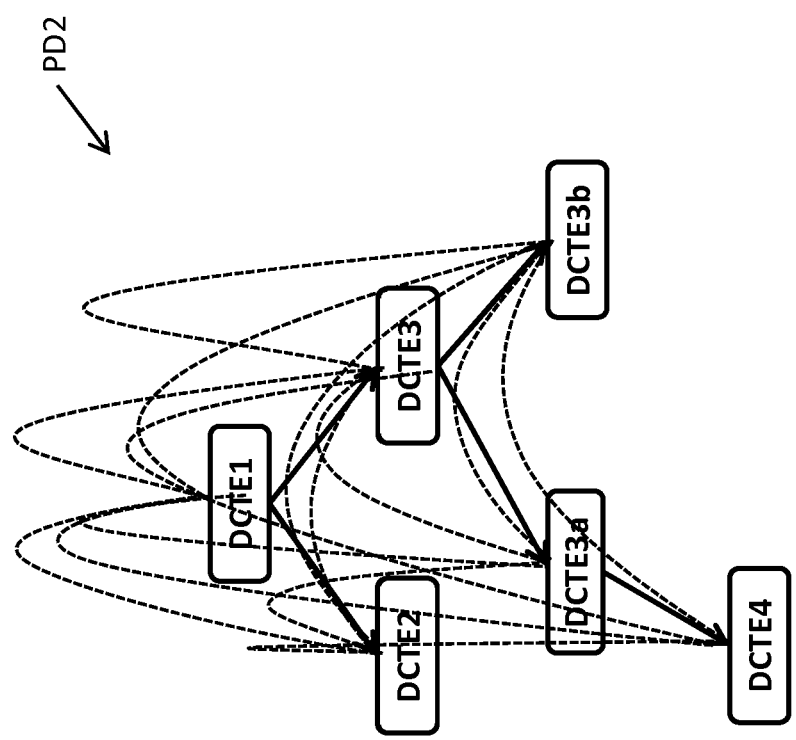
FIG. 5 illustrates a plurality of associative links formed between the dictionary entities identified in a patent document.

An associative link is established between entities to provide an indication of the association between the entities identified in the patent documents in the text corpus. The associative link is defined in the dictionary DCT(n) to identify how two or more dictionary entities DCTEn are linked to each other, thereby providing an indication of whether the dictionary entities DCTEn are related to each other or have the same or equivalent meanings. The associative link may be defined as a numerical value which indicates a strength of the association between the dictionary entities DCTEn. A schematic representation of the associative links between dictionary entities DCTEn extracted from the exemplary second patent document D2 (shown in FIG. 4B) is shown in FIG. 5. The associative links are represented by dashed lines extending between each of the dictionary entities DCTEn. The associative link between respective dictionary entities DCTEn may be determined in dependence on one or more factors derivable from analysis of the text corpus. In the arrangement illustrated in FIG. 5, the vertical height of each associative link indicates a strength of the association between the dictionary entities DCTEn.

A first indicator of the strength of the associative link may be the number of degrees of separation between said first and second entities within each patent document. A strong associative link may be identified between the first and second entities if the analysis identifies that the second entity forms part of the first entity (for example, the first entity "comprises", "includes" or "consists of" the second entity); this may be defined as one degree of separation. The associative link may be weaker if the first and second entities each form part of a third entity (for example, the third entity "comprises", "includes" or "consists of" the first and second entities); this may be defined as two degrees of separation. A weak associative link may be defined between the first and second entities in a patent document if the analysis identifies that the first and second entities form part of respective third and fourth entities (for example, the third entity "comprises" the first entity; and the fourth entity "comprises" the second entity); this corresponds to at least four degrees of separation, subject to the particular relationship between the third and fourth entities. If the entities are identified as being alternatives to each other, this may be understood as being an indicator of a strong association. For example, if a third entity is defined as being either the first entity or the second entity, then a strong association is identified between the first and second entities to indicate that they may be equivalent to each other.

A second indicator of the associative link between entities in a patent document may be the ordering of the entities within the hierarchical model. If the first and second entities are classified as having the same or similar order, this may indicate a stronger association than if they have been classified as having different orders.

It will be understood that other natural language processing techniques may be employed to identify further indicators of the associative link between the entities identified in the patent documents. A correlative weighting may be generated to indicate a strength of the correlation between the entities. The correlative weighting may be determined in dependence on a statistical analysis of each patent document, for example as a measure of the frequency of occurrence of both entities in a plurality of patent documents; and/or the proximity of the entities in relation to each other within the patent documents. The proximity may be assessed in dependence on a word count between the entities; and/or a frequency of occurrence, for example within the same clause, sentence or paragraph.

A user may optionally modify the associative links between the dictionary entities DCTEn, for example by strengthening or weakening the associative link. The document comparison system 100 may store any such modifications. The modified associative link(s) may be applied locally or globally.

Weighting

The document comparison system 100 may implement strategies to modify the weightings of the associative links between entities analysing the text corpus of patent documents to compile the dictionaries DCT(n). The dictionaries DCT(n) may be updated in dependence on a determined status of the patent document being analysed. For example, the weightings may be increased where the patent document being analysed is a granted patent or has been maintained following opposition proceedings. Thus, the significance of associative links identified in patent documents consisting of granted patents is greater than those identified for entities in patent documents consisting of patent applications. This adjustment in the relative weightings of the associative links is intended to reflect a greater confidence in patent documents which have completed examination before at least one Intellectual Property Office. In entities of analysis, the document comparison system 100 may determine that the status of the patent document by referencing the text corpus. In the case of patent documents filed before the European Patent Office, the suffix "A" denotes a pending application; the suffix "B" denotes a granted patent; and the suffix "C" denotes a patent maintained after opposition. The annotation may vary in different jurisdictions.

The document comparison system 100 may identify the claim entities CEn recited in the claims of a granted patent identified in the database and compare the identified claim entities CEn to each prior art document cited during prosecution of the granted patent. An assessment may be made in dependence on a specified category of the prior art document cited during examination. The text corpus of patent documents typically categorises a prior art document as being of background relevance (usually referenced as a "A" citation); of relevance to novelty or inventive step when taken along (usually referenced as an "X" citation); or of relevance to inventive step when combined with another document (usually referenced as a "Y" citation). The analysis may be further refined by analysing the specific passages of the prior art document highlighted as being of particular relevance to one or more claims of the patent application; this information is available in the patent document database of the relevant Intellectual Property Office (for example the patent document database provided by European Patent Office). The document comparison system 100 may optionally perform the same analysis in respect of the claims of the patent application as filed. A comparison of the claims of the pending application and of the granted patent against the prior art citations may further validate the analysis. The document comparison system 100 may modify the weightings in dependence on these findings.

Document Comparison

The document comparison system 100 is configured to compare the first and second documents D1, D2. In particular, the document comparison system 100 is configured to compare one or more claim of the first document D1 with the disclosure of the second document D2. The document comparison system 100 analyses the first document D1 to identify claim entities CEn and optionally also description entities which are related to the identified claim entities CEn. The document comparison system 100 analyses the second document D2 to identify description entities in each document using the techniques described herein to compile the dictionary DCT(n). The comparison is performed to determine if the second document D2 comprises description entities having substantially the same or equivalent meaning as the claim entities CEn.

Figure 6:
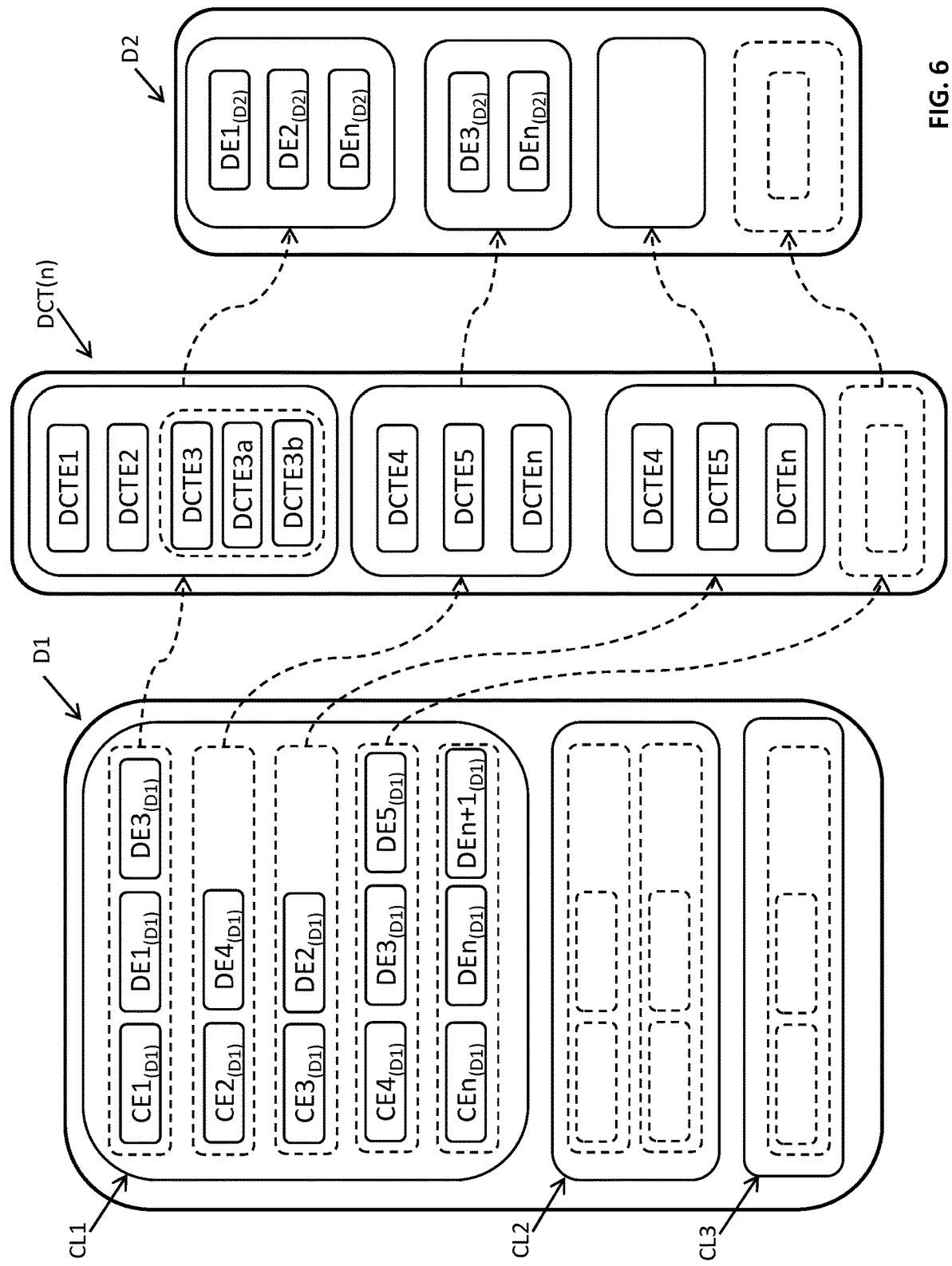
FIG. 6 illustrates the identification of dictionary entities equivalent to claim entities extracted from a first document and the use of the identified dictionary entities in the analysis of a second document.
Figure 7:
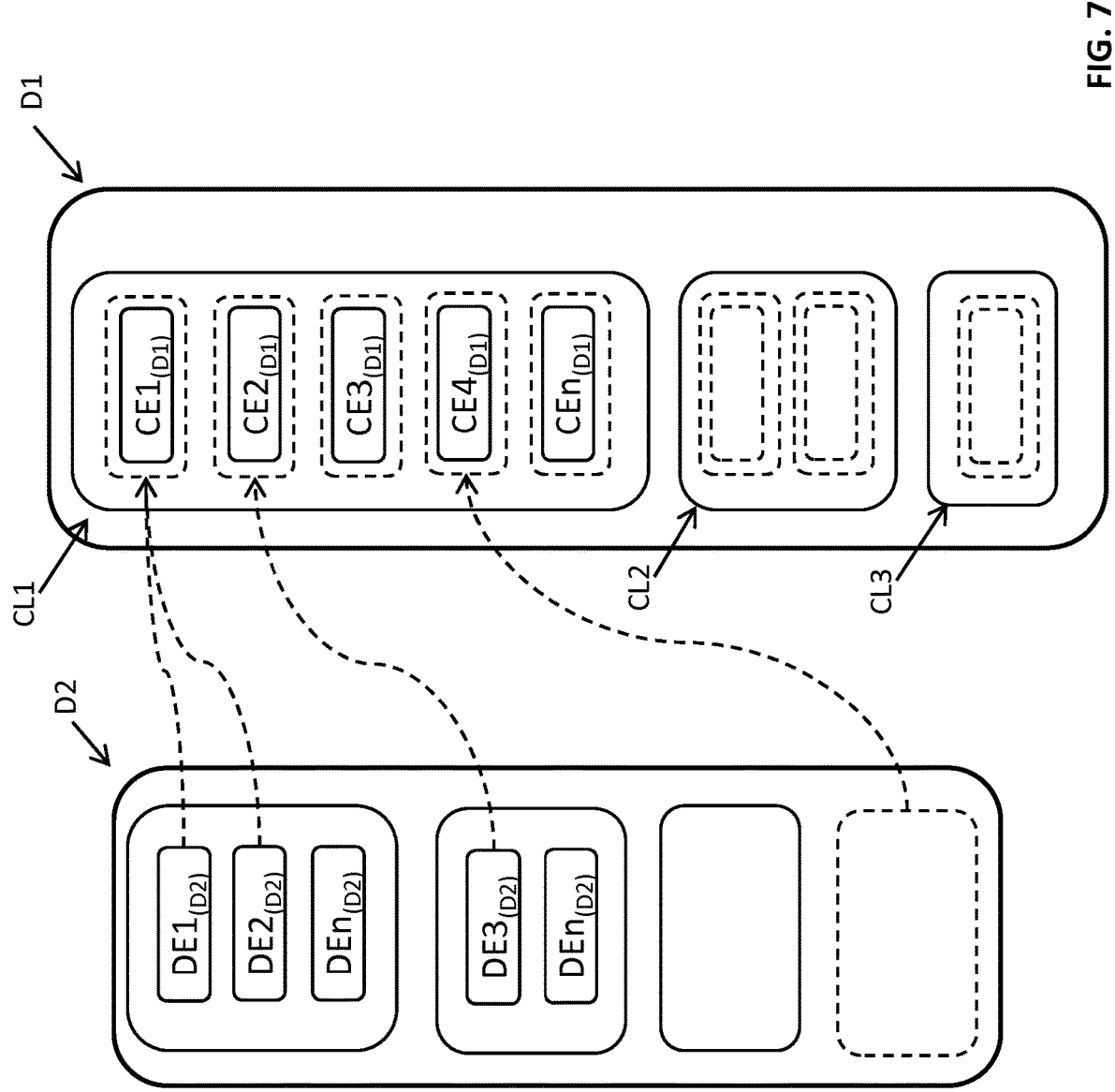
FIG. 7 illustrates the identification of links between the identified description entities in the second document with the claim entities in a first document.

A schematic representation of the comparison of the first and second documents D1, D2 is illustrated in FIGS. 6 and 7. In a first phase, each claim entity CEn identified in the first document D1 is used as a search term for the second document D2. The document comparison system 100 searches the second document D2 to identify the presence or absence of each claim entity CEn identified in the claims of the first document D1. If the claim entity CEn comprises a noun group (or noun phrase), the document comparison system 100 may search for the same noun group (i.e. search for the same noun group in D2), or may conduct a proximity search for at least some of the nouns making up the noun group (i.e. search for the same entities within a predetermined proximity of each other, for example within n words of each other, where n is a whole number greater than one). Alternatively, or in addition, the document comparison system 100 may identify one or more description entity in the description of the first document D1 which correspond to each claim entity CEn in the first document D1. The identified description entities are used as search terms for analysis of the second document D2. The document comparison system 100 searches the second document D2 to identify the presence or absence of each of the identified description entity DEn.

As shown in FIG. 6, the dictionary DCT(n) is used to further refine the comparison of the first and second documents D1, D2. A search is conducted within the dictionary DCT(n) in respect of each of the claim entities CEn. This search is used to identify one or more dictionary entity in the dictionary DCT(n) associated with each of the claim entities CEn. The entity(s) identified in the dictionary DCT(n) may be an equivalent of the claim entities CEn and/or may be related to the claim entities CEn. Each dictionary entity DCTEn identified in the dictionary DCT(n) is then used as a search term for the second document D2. The document comparison system 100 conducts a search to identify the presence or absence of the dictionary entities in the second document D2.

The document comparison system 100 is configured to identify entities in the dictionary DCT(n) which are associated with the claim entities CEn in dependence on the associative link defined in the dictionary DCT(n). Thus, the dictionary DCT(n) is searched to identify entities associated with each of the claim entities CEn. A cut-off threshold may be applied such that the search is conducted only in respect of entities having an associative link greater than a predefined threshold. The search is therefore conducted based on entities in the dictionary DCT(n) which have an associative link (with the claim entity CEn) which is greater than the cut-off threshold. The cut-off threshold may be adjustable to enable the scope of the search to be modified. The cut-off threshold may be adjustable in respect of one or more claim entity CEn, for example in respect of one or more of the claim entity CEn selected by the user; or may be adjustable for all of the claim entities CEn. The extent (breadth) of the search conducted in respect of a claim entity CEn may thereby be adjusted. If the validity of the first document D1 is being assessed, for example during examination, opposition or infringement proceedings, the cut-off threshold may be reduced to increase the number of entities identified in the dictionary DCT(n) as being equivalent to the claim entity CEn, thereby broadening the search conducted in respect of the second document D2. If the objective is to support or maintain validity of the first document D1, the threshold may be increased to reduce the number of entities identified in the dictionary DCT(n) as being equivalent to the claim entity CEn, thereby narrowing the search conducted in respect of the second document D2. The cut-off threshold may be adjusted locally, for example to adjust the scope of the search conducted in respect of a selected claim entity CEn. For example, a user may adjust the threshold of in respect of a particular claim entity CEn. Alternatively, or in addition, the threshold may be adjusted globally, for example to adjust the scope of the search conducted in respect of all of the claim entities CEn.

The ranking of entities in the hierarchical model may be used in the comparison of the first and second documents D1, D2. When construing the claims of a patent document, a claim entity CEn is generally determined as lacking novelty (i.e. being anticipated) by the earlier disclosure of the same feature or of an equivalent feature. The disclosure of a feature which is broader in scope than the claim entity CEn may not anticipate the claim entity CEn. Thus, by ranking the entities in the dictionary DCT(n), the document comparison system 100 may provide a more accurate comparison of the first and second documents D1, D2. When considering whether the claim entity CEn is disclosed in the second document D2, the document comparison system 100 may identify entities in the dictionary DCT(n) which have the same order as the claim entity CEn or a lower order than the claim entity CEn, as defined by the hierarchical model. Thus, the identification of entities in the dictionary DCT(n) to be used as search terms in the second document D2 may be at least partially biased towards those entities which have the same or lower order than the claim entity CEn. In the example illustrated in FIG. 4C, if the claim entity CEn is identified as being the same as or equivalent to the dictionary entity DCTE3, the second document D2 is searched to identify the dictionary entity DCTE3 and also each of the lower order dictionary entities DCTE3*a*, DCTE4 and DCTE5. The disclosure of the dictionary entity DCTE3 or any of the lower order dictionary entities DCTE3*a*, DCTE4 and DCTE5 may be relevant to the novelty of the source claim entity CEn identified in first document D1. This form of analysis is useful for assessing the novelty of the claim entity CEn T1. The presence of an entity having a broader scope may be relevant to the assessment of inventive step since it may provide an indication of a common goal or objective in the second document D2. When considering inventive step, the document comparison system 100 may extend the search of the second document D2 to identify any entity(s) having a broader scope than the claim entity CEn T1.

The document comparison system 100 may search the second document D2 for each identified claim entity CEn and also for synonyms of the claim entities CEn. The synonyms may be accessed from a standardised dictionary (or thesaurus) stored in the database 130. For example, the document comparison system 100 may search the second document D2 to identify each claim entity CEn and any synonyms of the claim entities CEn. Where the claim entity CEn comprises a noun group or noun phrase, the searches may be repeated for one or more of the nouns in the noun group or synonyms of the nouns. To facilitate assessment of inventive step, the document comparison system 100 may search the second document D2 to identify any teaching away from the claimed invention, for example by identifying entities which are an antonym of one or more claim entity CEn identified in the claims of the first document D1.

When conducting searches in the second document D2, the document comparison system 100 may divide the second document D2 into a plurality of sub-sections which are handled separately. Each sub-section may relate to a separate embodiment of the invention. The document comparison system 100 may sub-divide the specific description of the second document D2 to differentiate between arrangements referenced as a "first embodiment" and a "second embodiment" (or identified using equivalent language, such as a "further embodiment"). First and second embodiments EMB1, EMB2 are illustrated in FIGS. 2 and 3. The document comparison system 100 may repeat the searches in respect of each sub-section of the second document D2. Thus, the analysis of the second document D2 is performed in respect of the separate embodiments disclosed therein.

A flag (or marker) may be triggered to indicate when a claim entity CEn is identified in the second document D2. By collating the flags, the document comparison system 100 determines which of the claim entities CEn are disclosed in the second document D2 and which of the claim entities CEn are not disclosed in the second document D2. The flag may indicate a location of the corresponding description entity in the second document D2, for example indicating a line and page reference. At least in certain embodiments, the document comparison system 100 may annotate a digital copy of the second document D2 to facilitate review by a user. For example, the document comparison system 100 may annotate the second document D2 to highlight any description entity and/or claim entity CEn corresponding to the claim entities CEn of the first document D1. The annotation may be colour coded, for example to match The document comparison system 100 conducts separate searches of the second document D2 in respect of the claim entities CEn identified in each claim of the first document D1. Thus, a separate assessment is made in respect of each claim of the first document D1.

The document comparison system 100 may assess a likelihood of the entity identified in the dictionary DCT(n) as being used in conjunction with the other claim entities CEn. For example, the document comparison system 100 may use NLP techniques to determine a context of the claim entity CEn and the context may be used to determine the likelihood of one or more of the entities identified in the dictionary being used in this context. By considering context, the document comparison system 100 may select one or more entity from the dictionary DCT(n) identified as being contextually appropriate.

Framework

The document comparison system 100 is configured to establish a claim framework 200 defining one or more entity dependency between the claim entities CEn within one or more claims in the first document D1. The entity dependencies may be established between the claim entities CEn within each claim (intra-claim analysis) and between the claim entities CEn in different claims (inter-claim analysis). The claim framework 200 defines the entity dependency between each claim entity CEn and at least one other claim entity CEn. The claim framework 200 identifies the existence of the entity dependency and also a nature or form of the relationship between the claim entities CEn. As outlined herein, the entity dependencies between the claim entities CEn may be identified using NLP techniques. The entity dependencies may comprise one or more of the following: syntactic relations; subject/verb entity dependencies; verb/object entity dependencies; compound nouns; nominal modifiers of nouns; clausal predicates; temporal nominal modifiers; adjectives; possessives; and so one.

Figures 8, 9:
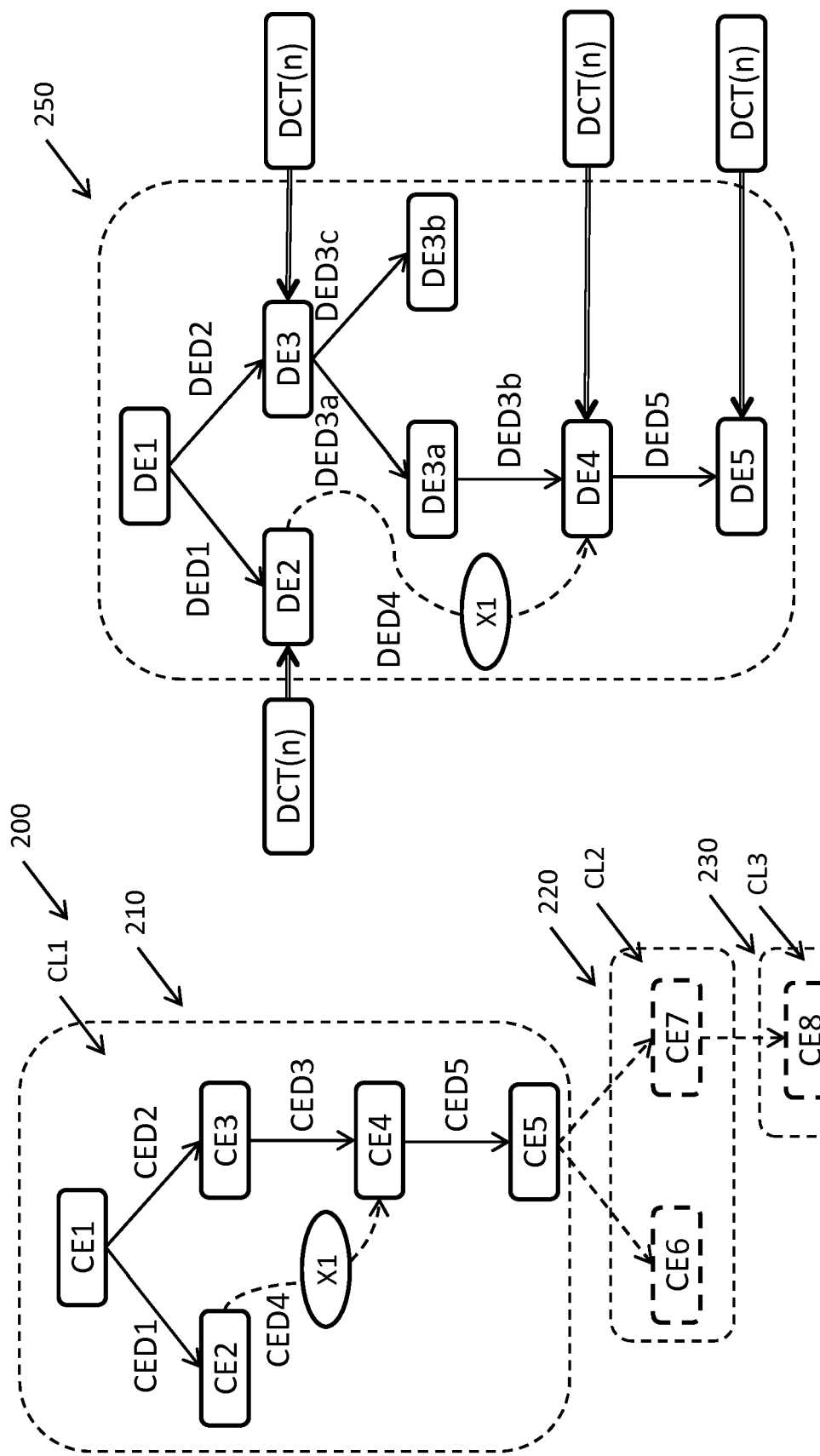
FIG. 8 illustrates the formation of a claim framework comprising claim entities and claim entity dependencies.
FIG. 9 illustrates the formation of a description framework comprising description entities and description entity dependencies.

The claim framework 200 is established in respect of each claim of the first document D1 and defines an entity dependency between the claim entities CEn within each claim CL. The claim framework 200 in the present embodiment is in the form of an arborescence (directed graph). The claim framework 200 comprises a plurality of branches extending between a plurality of claim nodes, each claim node representing a claim entity CEn. To facilitate comparison, each claim node may comprise description entities identified in the first document D1 as being equivalent to or related to the corresponding claim entity CEn. One of the claim nodes is rooted and defines a base claim node corresponding to the claim entity CEn having the highest order, typically the first (i.e. the initial) claim entity CEn defined in the introductory clause of the claim. The branches each indicate a relationship between the claim entities CEn, for example representing an entity dependency identified between the claim entities CEn. The branches may define a verb or other modifier which relates the claim entities CEn. The techniques described herein to assess the order of the entities in the hierarchical model may be used to compile the claim framework 200. For example, the analysis of the claim may identify instances where a first subject entity is defined as "consisting of", "being [in the form of]" or "is" a second subject entity. The second subject entity may be included in a list of entities, so the search may be extended to identify the second subject entity in proximity to the verb. Conversely, the analysis of the claim may identify instances where the first subject entity is defined as "forming part of" or "being a component of" the second subject entity. The branches may define the functional relationship between the first and second claim entities CEn. It will be understood that the branches between the claim entities CEn may be modified or defined by user inputs, for example to show alternate branches or additional branches between the claim entities CEn. The user inputs may be used to adjust the entity dependencies between the claim entities CEn or to define new entity dependencies. The establishment of the claim framework 200 for a sample claim is illustrated in FIG. 8 for the following exemplary claim:

1. A first claim entity CE1 comprising:
    a second claim entity CE2 and a third claim entity CE3;
    the third claim entity CE3 comprises a fourth claim entity CE4;
    wherein the second claim entity CE2 performs function X1 on the fourth claim entity CE4 to output a fifth claim entity CE5.

The document comparison system 100 analyses the claim to identify the claim entities CEn (referenced herein as a first claim entity CE1, a second claim entity CE2, a third claim entity CE3, etc.). The document comparison system 100 also identifies at least one entity dependencies between the claim entities CEn (referred to herein as claim entity dependencies CEDn). The claim entity dependencies CEDn define a structural relationship between the claim entities CEn. Within the claim framework 200, each claim entity CEn is identified as a claim node. The first claim entity CE1 is identified as "comprising" or "including" the second and third claim entities CE2, CE3. The document comparison system 100 establishes respective first and second claim entity dependencies CED1, CED2 between the first claim entity CE1 and the second and third claim entities CE2, CE3. The first and second claim entity dependencies CED1, CED2 are represented as first and second branches within the claim framework 200. The document comparison system 100 identifies a third claim entity dependency CED3 showing an entity dependency between the third claim entity CE3 and the fourth claim entity CE4. The third claim entity dependency CED3 defines a structural relationship between the third claim entity CE3 and the fourth claim entity CE4. A fourth claim entity dependency CED4 is identified between the second claim entity CE2 and the fourth claim entity CE4. The format of the fourth claim entity dependency CED4 is defined by a function X1. The function X1 may be derived from the language of the claim CL, and/or may be derived from the description of the first document D1, and/or by referencing a dictionary to identify equivalent functions. The fourth claim entity dependency CED4 defines the nature of the relationship between the second claim entity CE2 and the fourth claim entity CE4. The fifth claim entity CE5 is identified as an output and forms an end claim node in the illustrated arrangement.

The claim framework 200 defines the relationship between the claim entities CEn within each claim. This process is performed in respect of each claim of the first document D1, the dependent claims each forming a sub-frame which is linked to the frame of the main claim on which the claim is dependent. In the illustrated example, a first sub-frame 210 is created in respect of the first claim CL1. A second sub-frame 220 representing a second claim CL2, which is dependent on the first claim CL1, is added to the first sub-frame 210. In the illustrated example, the second claim defines an arrangement in which the fifth claim entity CE5 comprises sixth and seventh claim entities CE6, CE7. The second sub-frame 220 is illustrated as an extension of the first sub-frame 210, coupled to the node corresponding to the fifth claim element CE5. A third sub-frame 230 representing a third claim CL3, which is dependent on the second claim CL2, is added to the second sub-frame 220. In the illustrated example, the third claim CL3 defines an arrangement in which the seventh claim entity CE7 is in the form of an eighth claim entity CE8. The third sub-frame 230 is illustrated as an extension of the second sub-frame 220, coupled to the node corresponding to the seventh claim element CE7.

The claim framework 200 may optionally be output to a display device to provide a graphical representation of the claim framework 200. The claim framework 200 may be displayed as a two-dimensional or three-dimensional branching structure. A length (magnitude) of each branch may be inversely proportional to the strength of the associative link between the claim entities CEn.

When comparing the first and second documents D1, D2, the technique described herein for establishing the claim framework 200 is performed in respect of the second document D2 to form a description framework 250. A schematic representation of the description framework 250 is shown in FIG. 9. For the purposes of the present example, equivalent claim entities CEn and description entities DEn are shown as having the same numerical value to illustrate the comparison. The description framework 250 identifies an entity dependency between each description entity DEn and at least one other description entity DEn (referred to herein as description entity dependencies DEDn). The description framework 250 in the present embodiment is in the form of an arborescence (directed graph). The description entities DEn form description nodes in the description framework 250. The description framework 250 comprises a plurality of branches extending between the description nodes. One of the description nodes is rooted and defines a base node corresponding to the description entity having the highest order. The description nodes each comprise or consist of a description entity DEn. The branches each represent a description entity dependency DEDn. The description entity dependency DEDn may comprise or consist of a verb or other modifier which forms an entity dependency between the description entities DEn. In the case of the description framework 250, the description entities DEn may also include equivalent entities derived from the dictionary DCT (n). Thus, each description node may comprise a plurality of equivalent dictionary entities. The branches may also include equivalent entity dependencies derived from a dictionary, such as the dictionary DCT(n). As described herein, the number of equivalent entities or entity dependencies may be determined in dependence on a cut-off threshold. The document comparison system 100 searches each description node of the description framework 250 to identify any entities corresponding to the claim entities CEn. The branches are then plotted between the corresponding nodes to generate the description framework 250. The description framework 250 is analysed to determine if the one or more branches linking the identified description nodes are equivalent to the corresponding branch between the claim nodes. The description framework 250 may comprise a plurality of branches which are equivalent to a single branch in the claim framework 200. For example, the description framework 250 may comprise one or more intervening description nodes which are not present in the claim framework 200. The branches may be added to the description framework 250 to bypass any description nodes which do not have an equivalent claim node. If the specific description of the second document D2 comprises more than one embodiment, a separate description framework 250 may be established for each embodiment. A global framework may be established in respect of the specific description and the claims of second document D2. Alternatively, or in addition, a claim framework 200 may also be established for the second document D2.

The document comparison system 100 is configured to compare the configuration of the claim framework 200 to that of the description framework 250. The comparison identifies the presence or absence of branches in the description framework 250 corresponding to the branches in the claim framework 200. The comparison may also compare the orientation and/or the direction of the branches in the claim framework 200 and the description framework 250. In the example illustrated in FIGS. 8 and 9, the third claim entity dependency CED3 identified in the first claim CL1 of the first document D1 (between the third and fourth claim entities CE3, CE4) is compared to first and second intermediate description entity dependencies CED3*a* and CED3*b* identified in the description of the second document D2 (between the equivalent third description entity DE3, an intermediate description entity DE3a and the fourth description entity DE4). If the comparison determines that the either of the first and second intermediate description entity dependencies CED3a and CED3b is the substantially the same as or equivalent to the third claim entity dependency CED3, the document comparison system 100 identifies the entity dependency as a positive match. This approach may reduce the likelihood of the false-positive identification of entities in the second document D2, for example due to description entities being disclosed to perform different functions. It will be understood that it is not necessary for the document comparison system 100 to display the claim framework 200 or the description framework 250. However, these could be output, for example to a display device, for viewing by a user to facilitate visualisation of the claim framework 200 and the description framework 250.

The document comparison system 100 has been described herein as comparing the claims of the first document D1 with the disclosure of the second document D2. This approach may facilitate assessment of novelty. Alternatively, or in addition, the document comparison system 100 may be configured to facilitate assessment of inventive step, for example by comparing the claim entities CEn disclosed in the claims of the first document D1 with the disclosure of a plurality of other documents. For example, the first document D1 may be compared with at least second and third documents D2, D3. This comparison may determine that the claims of document D1 are distinguished from the disclosure of the second and third documents D2, D3 when considered separately, but the combination of the second and third documents D2, D3 may disclose all of the features of the claims. A matrix incorporating the claim entities CEn identified in the claims of the first document D1 may be populated to record which claim entities CEn are known from each of the other documents, the second and third documents D2, D3 in the present example. The analysis may be recorded in a two-dimensional matrix or a multi-dimensional matrix (having more than two dimensions). The strength of the correlation between each claim entity CEn and the corresponding entity disclosed in the prior art document may be indicated in the matrix to provide an indication of inventive step. For example, the weightings described herein may be used to provide an indication of the correlation between the entities. A low weighting may provide a relatively strong indication of inventive step (i.e. non-obviousness), whereas a high weighting may provide a relatively weak indication of inventive step (i.e. obviousness).

It will be understood that the technique of compiling a claim framework 200 and a description framework 250 may also be utilised to assess infringement of one or more patent claim.

Automated Document Coding

The document comparison system 100 is configured to indicate the outcome of the comparison of the one or more claim entity CEn recited in the claim of the first document D1 with the second document D2. The document comparison system 100 may automatically code the second document D2 for those features identified as corresponding to each claim entity CEn of the claim of the first document D1. The annotation of the second document D2 may take the form of automated document coding to identify one or more entity in the second document D2 as being relevant to the claim entities CEn identified in the first document D1. The document coding may, for example, establish a link between each claim entity CEn and one or more identified section of the second document D2. The resulting links may facilitate user assessment of the correlation between the claim entities CEn and the identified sections of the second document D2. A user input may indicate an accuracy of the identified links which may be used to update the comparison between the first and second documents D1 and D2. The document coding may be updated at least substantially in real time to reflect any such user inputs. The user input may also be used to update the weightings established between entities in the dictionaries DCT(n), thereby improving accuracy over time.

The document comparison system 100 may also generate a report identifying one or more claim entity CEn from the claim of the first document D1 together with an extract from the second document D2 of a section identified as being relevant to the claim entity CEn(s). Alternatively, or in addition, the document comparison system 100 may indicate one or more claim entity CEn recited in the claim of the first document D1 which are not known from the second document D2. This process may be repeated for each claim entity CEn recited in the claim of the first document D1. This process may also be performed in respect of each claim of the first document D1. Furthermore, the process may be repeated to compare the claims of the first document D1 with other documents. It will be understood that any such report may be modified to support or to contest novelty and inventive step of a claim of the first document D1.

The document comparison system 100 has been described as comparing the claims of the first document D1 with the content of the second document D2. In a variant, the document comparison system 100 may be configured to extend this comparison to other component parts of the first document D1, such as the statements of invention and the specific description. This analysis may be performed with a view to identifying features contained in the first document D1 which are not disclosed in the second document D2. This function may prove useful to identify possible amendments to differentiate the claims from the second document D2. To implement this function, the document comparison system 100 may identify description entities contained within the first document D1. The description entities may be identified applying an entity recognition algorithm to the first document D1. The entity recognition algorithm may, for example, utilise statistical analysis techniques, such as occurrence frequency, to identify the description entity. The document comparison system 100 may then conduct searches within the second document D2 to determine whether or not the identified description entities are disclosed in the second document D2. It will be appreciated that the search of the second document D2 to identify the presence or absence of the description entities may comprise one or more of the techniques described herein, for example by referencing the dictionary DCT(n) to identify equivalent entities.

The document comparison system 100 can be configured to compare the claims CLn of the first document D1 with the content of a plurality of documents. This comparison may, for example, be performed to assess the relevance of one or more prior art documents cited in a search report drawn up by an Intellectual Property Office. It has been recognised, however, that the document comparison system 100 may also be employed as part of a search strategy to identify prior art documents which are potentially relevant to the patentability of the claim of the first document D1. For example, the document comparison system 100 may be operable to compare the claims of the first document D1 with a plurality of prior art documents to identify the most relevant document(s). The comparison may, for example, be made in respect of a set of patent documents having a particular technical classification; or in respect of a set of patent documents identified using other search techniques, such as a keyword search.

The document comparison system 100 has been described herein as assessing patentability of the claims of the first document D1. It will be understood that the techniques used herein may also be used to assess whether the claims of a granted patent are potentially infringed. In this scenario, the first document D1 would typically be a granted patent, but the techniques may be employed in respect of a pending patent application (for example to assess the impact of alternate claim amendments). To assess infringement, the document comparison may be performed between the claims of the first document D1 and a second document D2 describing the product, process or method in question. It is envisaged that the second document D2 may take the form of a later patent document (for example a patent application having a later filing date) relating to the product, process or method. This comparison may be performed as part of a watching service to analyse later patent documents to determine whether they relate to an infringing or competing product. This process may be automated, for example to monitor all patent documents published in a particular technical field, relating to a given commercial sector or filed in a particular applicant name.

The document comparison system 100 may be used to compare scientific papers. In this scenario, the first and second documents D1, D2 may be respective first and second scientific papers. The section S(n) of the first document D1 may, for example, comprise or consist of an abstract of the first document D1. The document comparison system 100 may be configured to assess the correlation between the contents of the second document D2 with the abstract of the first document D1. The document comparison system 100 may thereby consider whether the contents of the abstract of the first document D1 are known from the second document D2.

The document comparison system 100 described herein may compare natural language documents in the same language or in different languages. The document comparison may reference more than one language dictionary to enable comparisons of different languages. The entities in different language dictionaries may be cross-referenced with each other to facilitate comparison. The hierarchical model defined in the custom dictionary DICTn may be applied to the language dictionaries to define a ranked order of the entities in each dictionary. The NLP techniques described herein may be applied to different languages. A framework defining the relationship between the entities may be generated utilising NLP techniques for the respective languages. The frameworks generated for documents in different languages may then be compared with each other in accordance with the techniques described herein.

It will be appreciated that various modifications may be made to the embodiment(s) described herein without departing from the scope of the appended claims. The dictionary DICTn has been described herein with particular reference to the identification of relationships between different entities extracted from a plurality of documents, for example patent documents, in a text corpus. It will be understood that the same techniques may be applied to identify relationships between different entity dependencies extracted from the documents in a text corpus. For example, entity dependencies which are equivalent to each other may be identified. The identified entity dependencies may also be ordered to form a hierarchical model.

The invention claimed is:

1. A document comparison system for comparing a first document with a second document, the first and second documents being natural language documents, the first document having at least a first section comprising a plurality of first document entities, and the second document comprising a plurality of second document entities;

the document comparison system comprising a processor and a memory device;

wherein the processor is configured to:
identify and extract the first document entities in the first section of the first document and determine a first framework defining one or more first entity dependency between the first document entities, each first entity dependency defining a relationship between two of the first document entities;

identify and extract the second document entities in the second document and determine a second framework defining one or more second entity dependency between the second document entities, each second entity dependency defining a relationship between two of the second document entities;

compare the first and second frameworks to assess a correlation between the first document entities and the second document entities, the comparison of the first and second frameworks comprises comparing the first entity dependencies between the first document entities in the first framework with the second entity dependencies between corresponding second document entities in the second framework; and generate a report identifying one or more first document entity from the first section of the first document together with an extract from the second document of a section identified as being relevant to the first document entity.

2. A document comparison system as claimed in claim 1, wherein the first framework comprises a plurality of first branches extending between a plurality of first nodes, each first node representing a first document entity and each first branch representing a first entity dependency indicating the relationship between the first nodes.

3. A document comparison system as claimed in claim 2, wherein one of the first nodes is rooted and defines a base first node corresponding to the first document entity having the highest order.

4. A document comparison system as claimed in claim 1, wherein the first document framework is in the form of a first directed graph.

5. A document comparison system as claimed in claim 1, wherein the second framework comprises a plurality of second branches extending between a plurality of second nodes, each second node representing a second document entity and each second branch representing a second entity dependency indicating the relationship between the second nodes.

6. A document comparison system as claimed in claim 5, wherein one of the second nodes is rooted and defines a base second node corresponding to the second document entity having the highest order.

7. A document comparison system as claimed in claim 1, wherein the second document framework is in the form of a second directed graph.

8. A document comparison system as claimed in claim 1, wherein the first document is a first patent document and the first section comprises or consists of one or more first patent claims, each first document entity being a first claim entity, wherein the document comparison system is configured to indicate the outcome of the comparison of the one or more first claim entity with the second document entities.

9. A document comparison system as claimed in claim 8, wherein the document comparison system is configured automatically to code the second document to identify the one or more second document entity identified as corresponding to each first claim entity.

10. A document comparison system as claimed in claim 1, wherein the second document is a second patent document comprising a specific description, each second document entity being a second description entity; wherein the second framework is a description framework.

11. A document comparison system as claimed in claim 10, wherein the specific description comprises more than one embodiment, the document comparison system being configured to determine a separate second framework for each embodiment.

12. A document comparison system as claimed in claim 1, wherein the one or more first entity dependency each comprise one or more of the following: syntactic relations; subject/verb entity dependencies; and verb/object entity dependencies.

13. A method implemented by a computational device to comparing a first document with at least a second document, the first and second documents being natural language documents, the first document comprising at least a first section comprising a plurality of first document entities, and the second document comprising a plurality of second document entities; the method comprising:
    identifying the first document entities in the first section of the first document and determine a first framework defining one or more first entity dependency between the first document entities; and
    identifying and extracting the second document entities in the second document and determining a second framework defining one or more second entity dependency between the second document entities, each second entity dependency defining a relationship between two of the second document entities;
    comparing the first and second frameworks to assess a correlation between the first document entities and the second document entities, the comparison of the first and second frameworks comprises comparing the first entity dependencies between the first document entities in the first framework with the second entity dependencies between corresponding second document entities in the second framework; and
    generating a report identifying one or more first document entity from the first section of the first document together with an extract from the second document of a section identified as being relevant to the first document entity.

14. A method as claimed in claim 13, wherein the first framework comprises a plurality of first branches extending between a plurality of first nodes, each first node representing a first document entity and each first branch representing a first entity dependency indicating the relationship between the first nodes.

15. A method as claimed in claim 14, wherein one of the first nodes is rooted and defines a base first node corresponding to the first document entity having the highest order.

16. A method as claimed in claim 13, wherein the first document framework is in the form of a first directed graph.

17. A method as claimed in claim 13, wherein the second framework comprises a plurality of second branches extending between a plurality of second nodes, each second node representing a second document entity and each second branch representing a second entity dependency indicating the relationship between the second nodes.

18. A method as claimed in claim 17, wherein one of the second nodes is rooted and defines a base second node corresponding to the second document entity having the highest order.

19. A method as claimed in claim 13, wherein the second document framework is in the form of a second directed graph.

20. A method as claimed in claim 13, wherein the first document is a first patent document and the first section comprises or consists of one or more first patent claims, each first document entity being a first claim entity, wherein the method comprises indicating the outcome of the comparison of the one or more first claim entity with the second document entities.

21. A method as claimed in claim 20, wherein the method comprises automatically coding the second document to identify the one or more second document entity identified as corresponding to each first claim entity.

22. A document comparison system as claimed in claim 13, wherein the second document is a second patent document comprising a specific description, each second document entity being a second description entity; the second framework being a description framework.

23. A document comparison system as claimed in claim 22, wherein the specific description comprises more than one embodiment, the document comparison system being configured to establish a second framework for each embodiment.

24. A method as claimed in claim 13, wherein the one or more first entity dependency and/or the one or more second entity dependency each comprise one or more of the following: syntactic relations; subject/verb entity dependencies; and verb/object entity dependencies.

25. A non-transitory computer-readable medium having a set of instructions stored therein which, when executed, cause a processor to perform the method claimed in claim 13.

* * * * *